(12) United States Patent
Gopalakrishnan et al.

(10) Patent No.: US 7,869,346 B2
(45) Date of Patent: Jan. 11, 2011

(54) METHODS AND APPARATUS FOR CLUSTER LICENSING IN WIRELESS SWITCH ARCHITECTURE

(75) Inventors: Kamatchi Soundaram Gopalakrishnan, Milpitas, CA (US); Ajay Malik, Santa Clara, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 1021 days.

(21) Appl. No.: 11/364,815

(22) Filed: Feb. 28, 2006

(65) Prior Publication Data

US 2007/0201415 A1 Aug. 30, 2007

(51) Int. Cl.
*G01R 31/08* (2006.01)
(52) U.S. Cl. .................. 370/218; 370/216; 370/217; 370/252; 370/254
(58) Field of Classification Search .............. None
See application file for complete search history.

(56) References Cited

U.S. PATENT DOCUMENTS

| | | | |
|---|---|---|---|
| 6,574,612 B1 | 6/2003 | Baratti et al. | |
| 6,725,446 B1 * | 4/2004 | Hahn et al. | 717/103 |
| 2002/0184376 A1 * | 12/2002 | Sternagle | 709/230 |
| 2004/0199760 A1 | 10/2004 | Mazza et al. | |
| 2005/0195799 A1 * | 9/2005 | Burne et al. | 370/352 |

FOREIGN PATENT DOCUMENTS

EP 1414194 A1 4/2004

OTHER PUBLICATIONS

International Search Report for PCT/US2007/062979 mailed Jul. 24, 2007.
International Preliminary Report on Patentability dated Sep. 12, 2008 in related application PCT/US2007/062979.

* cited by examiner

*Primary Examiner*—Vincent P Harper
*Assistant Examiner*—Mazda Sabouri
(74) *Attorney, Agent, or Firm*—Brian M. Mancini

(57) ABSTRACT

Wireless switch licenses are assigned on a cluster basis rather than being limited to individual switches. A switch cluster is made up of two or more wireless switches that each having an assigned number of licenses. Each of the wireless switches is configured to establish the switch cluster with the other wireless switches, and to verify the identity of each other wireless switch in the switch cluster during operation. License restrictions are enforced based upon a total number of licenses for the switch cluster so that the sum of the numbers of licenses assigned to the wireless switches in the cluster are available for use even if one or more of the other wireless switches in the cluster become unavailable.

15 Claims, 1 Drawing Sheet

METHODS AND APPARATUS FOR CLUSTER LICENSING IN WIRELESS SWITCH ARCHITECTURE

TECHNICAL FIELD

The present invention relates generally to wireless local area networks (WLANs) and, more particularly, to cluster licensing of wireless switches in a WLAN.

BACKGROUND

In recent years, there has been a dramatic increase in demand for mobile connectivity solutions utilizing various wireless components and wireless local area networks (WLANs). This generally involves the use of wireless access points that communicate with mobile devices using one or more RF channels.

In one class of wireless networking systems, relatively unintelligent access ports act as RF conduits for information that is passed to the network through a centralized intelligent switch, or "wireless switch," that controls wireless network functions. In a typical WLAN setting, one or more wireless switches communicate via conventional networks with multiple access points that provide wireless links to mobile units operated by end users. Frequently, wireless switches are licensed on a "per connection" basis whereby the operator purchases a license that allows the switch to logically connect with a particular number of access ports. As the operator purchases one or more licenses, the switch manufacturer or another trusted licensing entity typically provides a cryptographic key that is de-crypted by the switch to unlock the licensed capability. This licensing scheme allows operators to purchase only the number of licenses that are needed at a particular time, without paying for excess unused capability.

The wireless switch, then, typically acts as a logical "central point" for most wireless functionality. Consolidation of WLAN intelligence and functionality within a wireless switch provides many benefits, including centralized administration and simplified configuration of switches and access points. One disadvantage, however, is that malfunctions at the wireless switch can effect a significant portion of the wireless network. That is, if the wireless switch were to become unavailable due to power failure, malfunction, or some other reason, then the access points logically connected to that switch will typically also become unavailable.

To reduce the effects of wireless switch unavailability, wireless switches commonly incorporate "warm standby" features whereby a backup switch is configured to take over if a primary switch becomes incapacitated. While warm standby can mitigate the effects of centralized switching, it can be difficult to implement effectively without compromising the licensing scheme described above. That is, it is difficult to transfer licenses from a primary switch to a backup switch in the event that the primary switch becomes unavailable. In such circumstances, either the licenses need to be temporarily transferred to the backup switch, (which can be cumbersome and time consuming for both the switch operator and the licensing authority), or the customer loses out on some purchased functionality while the primary switch remains unavailable.

Accordingly, it is desirable to provide a licensing scheme that can allow continued access to licensed capabilities even in response to changes in network resources. Other desirable features and characteristics will become apparent from the subsequent detailed description and the appended claims, taken in conjunction with the accompanying drawings and the foregoing technical field and background.

BRIEF SUMMARY

Wireless switch licenses are assigned on a cluster basis rather than being limited to individual switches. A switch cluster is made up of two or more wireless switches that each having an assigned number of licenses. Each of the wireless switches is configured to establish the switch cluster with the other wireless switches; and to verify the identity of each other wireless switch in the switch cluster during operation. License restrictions are enforced based upon the maximum number of licenses assigned to any switch in cluster so that additional licenses assigned to the wireless switches in the cluster are available for use even if one or more of the other wireless switches in the cluster become unavailable.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Figure 1:
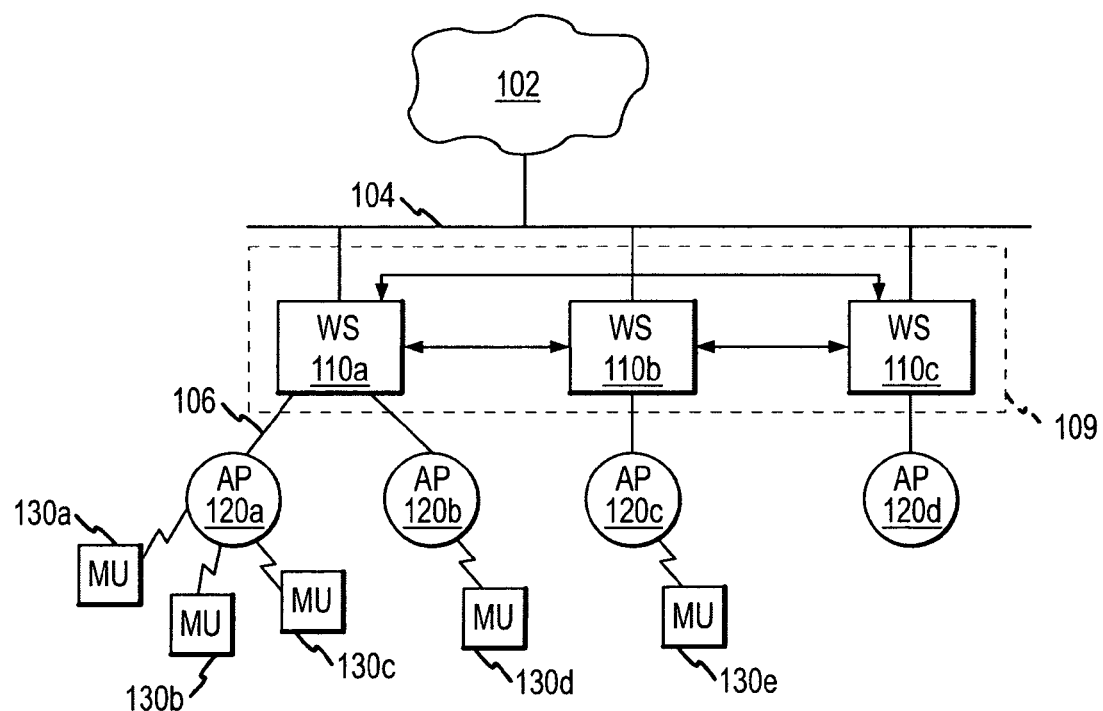
FIG. 1 is a conceptual overview of an exemplary wireless network with a three-switch cluster.

The following detailed description is merely illustrative in nature and is not intended to limit the invention or the application and uses of the invention. Furthermore, there is no intention to be bound by any express or implied theory presented in the preceding technical field, background, brief summary or the following detailed description.

According to various exemplary embodiments, licensing concerns such as those expressed above are effectively sidestepped by licensing on a cluster basis rather than on the basis of individual switches. As noted above, conventional licensing allows switches to support logical connections with only a pre-approved number of access ports. With cluster licensing, each switch effectively recognizes a "cluster license", which may be defined to be equal to the greatest number of licenses held by any switch participating in the cluster, thereby allowing other switches in the cluster to make use of excess licenses so long as the number of approved cluster licenses is not exceeded. Moreover, if the switch having the greatest number of licenses in the cluster should become unavailable due to malfunction, power loss or some other cause, then other switches in the cluster are potentially allowed to use the licenses associated with the unavailable switch, thereby preserving the resources paid for by the customer, providing improved redundancy, and maintaining the integrity of the licensing process without significant overhead by the switch operator or the licensing authority.

Various aspects of the exemplary embodiments may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., radio-frequency (RF) devices, memory elements, digital signal processing elements, logic elements and/or the like, which may carry out a variety of functions under the control of one or more microprocessors or other control devices. In addition, the present invention may be practiced in conjunction with any number of data transmission protocols and that the system described herein is merely one exemplary application for the invention.

For the sake of brevity, conventional techniques related to signal processing, data transmission, signaling, network control, the IEEE 802.11 family of specifications, and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

Without loss of generality, in the illustrated embodiment, many of the functions usually provided by a traditional wireless access point (e.g., network management, wireless configuration, and the like) can be concentrated in a corresponding wireless switch. It will be appreciated that the present invention is not so limited, and that the methods and systems described herein may be used in the context of other network environments, including any architecture that makes use of client-server principles or structures.

Referring now to FIG. 1, one or more switching devices 110 (alternatively referred to as "wireless switches," "WS," or simply "switches") are coupled via one or more networks 104 (e.g., an ETHERNET or other local area network coupled to one or more other networks or devices, indicated by network cloud 102). One or more wireless access ports 120 (alternatively referred to as "access ports" or "APs") are configured to wirelessly connect switches 110 to one or more mobile units 130 (or "MUs") after a suitable AP adoption process. APs 120 are suitably connected to corresponding switches 110 via communication lines 106 (e.g., conventional Ethernet lines). Any number of additional and/or intervening switches, routers, servers and other networks or components may also be present in the system. Similarly, APs 120 may have a single or multiple built-in radio components. Various wireless switches and access ports are available from SYMBOL TECHNOLOGIES of San Jose, Calif., although the concepts described herein may be implemented with products and services provided by any other supplier.

A particular AP 120 may have a number of associated MUs 130. For example, in the illustrated topology, MUs 130(a), 130(b) and 130(c) are logically associated with AP 120(a), while MU 130(d) is associated with AP 120(b). Furthermore, one or more APs 120 may be logically connected to a single switch 110. Thus, as illustrated, AP 120(a) and AP 120(b) are connected to WS 110(a), and AP 120(c) is connected to WS 110(b). Again, the logical connections shown in the FIGURE are merely exemplary, and other embodiments may include widely varying components arranged in any topology.

As noted above, each AP 120 establishes a logical connection to at least one WS 110 through a suitable adoption process. In a typical adoption process, each AP 120 responds to a "parent" message transmitted by one or more WSs 110. The parent messages may be transmitted in response to a request message broadcast by the AP 120 in some embodiments; alternatively, one or more WSs 110 may be configured to transmit parent broadcasts on any periodic or a periodic basis. When the AP 120 has decided upon a suitable "parent" WS 110, AP 120 transmits an "adopt" message to the parent WS 110.

Following the adoption process, each WS 110 determines the destination of packets it receives over network 104 and routes that packet to the appropriate AP 120 if the destination is an MU 130 with which the AP is associated. Each WS 110 therefore maintains a routing list of MUs 130 and their associated APs 130. These lists are generated using a suitable packet handling process as is known in the art. Thus, each AP 120 acts primarily as a conduit, sending/receiving RF transmissions via MUs 130, and sending/receiving packets via a network protocol with WS 110. Equivalent embodiments may provide additional or different functions as appropriate.

Wireless switches 110A-C are shown in FIG. 1 as being combined into a single cluster 109 to provide backup and redundancy as appropriate. That is, if one or more switches 110A-C were to become unavailable for any reason, then one or more other switches 110 in the cluster 109 would automatically absorb some or all of the functions previously carried out by the unavailable switch 110, thereby continuing service to mobile users 130 in a relatively smooth manner. In practice, clusters could be formed from any grouping of two or more wireless switches 110 that are assigned any number of licenses. A simple cluster could be made up of a primary switch 110 and a dedicated backup, for example, in which case the backup may be assigned zero (or relatively few) licenses. Alternatively, any number of active switches could provide redundancy for each other, provided that they are able to intercommunicate through networks 104 and/or 102. The cluster 109 made up of switches 110A-C, then, would allow any switch 110 in the cluster to absorb functions carried out by any other switch 110 if the other switch 110 were to become unavailable.

Redundancy is provided in any manner. In various embodiments, switches 110A-C making up a cluster 109 suitably exchange adoption information (e.g. number of adopted ports, number of licenses available, etc.) as appropriate. This data exchange may take place on any periodic, a periodic or other basis. In the event that wireless switch 110A in FIG. 1, for example, would become unavailable, switches 110B and 110C may have ready access to a relatively current routing list that would include information about APs 120A-B and/or MUs 130A-D previously associated with switch 110A. In such embodiments, either switch 110B-C may therefore quickly contact APs 120A-B following unavailability of switch 110A to take over subsequent routing tasks. Similarly, if switches 110B or 110C should become unavailable, switch 110A would be able to quickly assume the tasks of either or both of the other switches 110B-C. In other embodiments, the remaining switches 110 do not directly contact the APs 120 following the disappearance of another switch in the cluster, but rather adopt the disconnected APs 120 using conventional adoption techniques.

Clusters may be established in any manner. Typically, clusters are initially configured manually on each participating WS 110 so that each switch 110 is able to identify the other members of the cluster 109 by name, network address or some other identifier. When switches 110A-C are active, they further establish the cluster by sharing current load information (e.g. the current number of adopted ports) and/or other data as appropriate. Switches 110A-C may also share information about their numbers of available licenses so that other switches 110 in cluster 109 can determine the number of cluster licenses available.

The number of cluster licenses can be assigned in any manner. The total number of AP connections that are available to the cluster could be used, for example, or the maximum number of licenses assigned to any one switch 110 may be used as the cluster license. In such embodiments, a customer would typically purchase licenses for a single switch 110 in the cluster 109, since these licenses could be shared amongst the other switches in the cluster.

In various embodiments, the time period between switch data exchanges is manually configured by the operator to allow flexibility in managing traffic on network 104. Alternatively, the timing and/or formatting of such messages may be defined by a protocol or standard. Establishing cluster 109 could therefore refer to either configuration of the cluster, and/or the establishment of cluster communication while the various nodes in cluster 109 are active.

During operation of the cluster 109, each switch 110A-C suitably verifies the continued availability of the other switches 110. Verification can take place through any appropriate technique, such as through transmission of regular "heartbeat" messages between servers. In various embodiments, the heartbeat messages contain an identifier of the particular sending switch 110. This identifier is any token, certificate, or other data capable of uniquely identifying the particular switch 110 sending the heartbeat message. In various embodiments, the identifier is simply the media access control (MAC) address of the sending switch 110. MAC addresses are uniquely assigned to hardware components, and therefore are readily available for use as identifiers. Other embodiments may provide digital signatures, certificates or other digital credentials as appropriate, or may simply use the device serial number or any other identifier of the sending switch 110. The heartbeat messages may be sent between switches 110 on any periodic, a periodic or other temporal basis. In an exemplary embodiment, heartbeat messages are exchanged with each other switch 110 operating within cluster 109 every second or so, although particular time periods may vary significantly in other embodiments.

If a heartbeat message from any switch 110 fails to appear within an appropriate time window, another switch 110 operating within cluster 109 adopts the access ports 120 previously connected with the non-responding switch 110 for subsequent operation. As noted above, this may result in a number of AP connections that exceeds the number of licenses previously applied to the adopting switch 110. By assigning licenses to the cluster 109 rather than the particular switch 110, however, the connections are allowed so long as the total number of connections does not exceed the number of cluster licenses associated with switches 110 in cluster 109. In one embodiment, this number corresponds to the maximum number of licenses assigned to any one switch 110 in cluster 109.

To provide an illustrative example (and with continued reference to FIG. 1), in an exemplary embodiment switch 110A may be configured with twenty licenses, switch 110B may be configured with five licenses, and switch 110C may be configured with a single license, for a total of twenty-six licenses available for use in cluster 109. In the event that switch 110A fails to send heartbeat messages for some period of time (e.g. on the order of a few seconds or so), switches 110B-C can adopt the access ports 120A-B previously associated with switch 110A. In embodiments wherein the number of cluster licenses is equal to the maximum number assigned to any one switch 110, any of the other switches 110 in cluster 109 are still allowed to support up to twenty licenses, so either of the other switches 110B-C can adopt ports 120A-B, even though adopting more than one port 120 would otherwise violate switch 110C's licensing restrictions. In other embodiments that base the number of cluster licenses on the sum of the licenses contained within the group, twenty six licenses would be available as a cluster maximum. So long as cluster maximums are not exceeded, switches 110 operating within a cluster 109 may assign and enforce the licenses amongst themselves in any appropriate or desired manner.

Enforcement of cluster maxima can continue for any appropriate period of time. In various embodiments, cluster 109 continues to operate with the full allotment of licenses even though one or more switches 110 is unavailable. If a switch 110 is removed from network 104 and forwarded to a technician for repair, for example, the licenses assigned to that switch 110 can be applied to other still-active switches in cluster 109 during the period of absence if the removed switch 110 had more licenses than the switches remaining in the cluster. The remaining switches 110 will continue to use the remaining licenses until the repaired switch is returned, or until cluster 109 is broken. Clusters 109 may be broken by re-configuring the switches 110, for example, or by any other technique. In various embodiments, adding a new switch 110 to a cluster will remove any licenses from previously-present switches 110 to prevent exploitation of license restrictions. That is, if a ten-license switch 110 is removed from a cluster 109 and subsequently replaced by a different five-license (or zero license) switch, the other switches in the cluster will recognize the new switch 110 as a new participant (due to the MAC or other unique identifier), and will refuse to share licenses from the previous switch with the newly-arriving switch 110. A new cluster 109 may be formed with the new switch, however, with the new cluster 109 enforcing a cluster license limit based upon a comparison of the number of licenses provided from the new switch 110.

Various modifications can be applied to the particular embodiments described above. One or more switches 110 may be configured with "zero licenses", for example, to provide a low-cost backup node that can readily replace another active switch with a larger number of licenses.

The particular aspects and features described herein may be implemented in any manner. In various embodiments, the processes described above are implemented in software that executes within one or more wireless switches 110. This software may be in source or object code form, and may reside in any medium or media, including random access, read only, flash or other memory, as well as any magnetic, optical or other storage media. In other embodiments, the features described herein may be implemented in hardware, firmware and/or any other suitable logic.

It should be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A method of operating one of a plurality of wireless switches arranged in a wireless switch cluster each having an assigned number of licenses, the method comprising the steps of:

establishing a cluster of wireless switches having a cluster license maximum, wherein the cluster license maximum equals a greatest number of licenses held by any switch in the cluster of wireless switches;

verifying the identity and the assigned number of licenses for each of the other wireless switches in the cluster during operation, such that each wireless switch recognizes the greatest number of assigned licenses to any one switch as the cluster license maximum; and any wireless switch of the cluster operating to exceed its assigned number of licenses up to, but not exceeding, the cluster license maximum if one or more of the other switches in the cluster become unavailable.

2. The method of claim 1 wherein the assigned number of licenses for at least one of the wireless switches in the cluster is zero.

3. The method of claim 1 wherein the identity of each other wireless switch in the cluster is verified based upon a media access control (MAC) address of the switch.

4. The method of claim 1, wherein verifying includes each switch sending a routing list of access points assigned to that switch, and further comprising the step of adopting an access point assigned to another one of the switches in the plurality of switches if the another one of the switches becomes unavailable.

5. The method of claim 1 wherein verifying includes each switch transmitting a heartbeat signal to the other switches in the switch cluster.

6. The method of claim 5 wherein the heartbeat signal comprises an identifier of the wireless switch and a number of licenses assigned to the wireless switch.

7. The method of claim 6 wherein the identifier is a media access control number.

8. The method of claim 6 wherein the identifier is a serial number of the wireless switch.

9. The method of claim 1 further comprising the step of reverting to enforcing the number of licenses assigned to the wireless switch if the cluster is broken.

10. The method of claim 9 wherein the cluster is broken though reconfiguration of the wireless switch.

11. The method of claim 9 wherein the cluster is broken though addition of another wireless switch not previously in the cluster.

12. The method of claim 1 wherein establishing includes each switch being provided a cryptographic key that is decrypted by the switch to unlocked its licensed capability.

13. The method of claim 1 further comprising the step of purchasing licenses for a single switch in the cluster.

14. A wireless switch operating as one of a plurality of wireless switches in a wireless switch cluster each having an assigned number of licenses, the wireless switch comprising:

means for establishing a cluster of wireless switches having a cluster license maximum, wherein the cluster license maximum equals a greatest number of licenses held by any switch in the cluster of wireless switches;

means for verifying the identity of each other wireless switch in the cluster during operation, such that the wireless switch recognizes the greatest number of assigned licenses to any one switch as the cluster license maximum; and means for operating to exceed its assigned number of licenses up to, but not exceeding, the cluster license maximum if one or more of the other switches in the cluster become unavailable.

15. A switch cluster comprising a plurality of wireless switches each having an assigned number of licenses, wherein each of the plurality of wireless switches is configured to establish the switch cluster having a cluster license maximum with the other wireless switches, wherein the cluster license maximum equals a greatest number of licenses held by any switch in the cluster of wireless switches, to verify the identity of each other wireless switch in the switch cluster during operation, such that each wireless switch recognizes the greatest number of assigned licenses to any one switch as the cluster license maximum, and any wireless switch of the cluster operable to exceed its assigned number of licenses up to, but not exceeding, the cluster license maximum if one or more of the other switches in the cluster become unavailable.

* * * * *